(12) United States Patent
Ida et al.

(10) Patent No.: US 7,327,480 B1
(45) Date of Patent: Feb. 5, 2008

(54) SERVER APPARATUS AND INTERNET FACSIMILE APPARATUS AND COMMUNICATION TERMINAL CAPABILITY EXCHANGING METHOD

(75) Inventors: Yoshihiro Ida, Iwatsuki (JP); Tatsuo Bando, Musashino (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/334,617

(22) Filed: Jun. 17, 1999

(30) Foreign Application Priority Data

Jan. 25, 1999 (JP) .................................. 11-015760

(51) Int. Cl.
*G06F 15/00* (2006.01)

(52) U.S. Cl. ............... 358/1.15; 358/402; 358/435; 358/440; 379/100.09; 709/219

(58) Field of Classification Search ...... 358/1.15–1.16, 358/402–404, 407, 442, 434, 400, 408, 435, 358/436, 440; 379/100.01, 100.02, 100.05, 379/100.06, 100.08, 100.09, 93.24, 130; 709/206, 239, 203, 217, 218–219, 238, 245; 340/825.44; 395/200.3, 200.47
See application file for complete search history.

(56) References Cited

U.S. PATENT DOCUMENTS

| | | | |
|---|---|---|---|
| 5,528,383 A | | 6/1996 | Tezuka et al. |
| 5,581,366 A | * | 12/1996 | Merchant et al. ........... 358/400 |
| 5,767,985 A | | 6/1998 | Yamamoto et al. |
| 5,838,685 A | * | 11/1998 | Hochman ................... 370/428 |
| 5,864,673 A | * | 1/1999 | Ohto et al. ................. 709/219 |
| 5,872,845 A | * | 2/1999 | Feder ......................... 358/442 |
| 5,881,233 A | | 3/1999 | Toyoda et al. |
| 6,119,234 A | * | 9/2000 | Aziz et al. .................. 713/201 |
| 6,145,084 A | * | 11/2000 | Zuili et al. .................. 726/3 |

(Continued)

FOREIGN PATENT DOCUMENTS

EP       0809389       11/1997

(Continued)

OTHER PUBLICATIONS

"Storage of the Capabilities of Frequently Called Facsimile Machines", IBM Technical Disclosure Bulletin, IBM Corp., Armonk, New York, US, vol. 32, No. 12, May 1, 1990, p. 34, XP 000105064, ISSN 0018-8689.

(Continued)

*Primary Examiner*—Douglas Q. Tran
*Assistant Examiner*—Chan S. Park
(74) *Attorney, Agent, or Firm*—Greenblum & Bernstein, P.L.C.

(57) ABSTRACT

In a server apparatus, a registration processing section analyzes a capability information transmission mail received by an E-mail communication section, and extracts capability information. Next, a sender's address and capability information are made to correspond to each other so to be stored in a capability information table. When a normal E-mail is received, designation capability information, which has been made to correspond to the recipient address, is obtained from the capability information table, and an image file which is attached to the received E-mail is converted to an image file to be suitable for designation capability information. This makes it possible to control a load applied onto internet facsimile apparatuses and to exchange capability between the internet facsimile apparatuses.

3 Claims, 10 Drawing Sheets

U.S. PATENT DOCUMENTS

| | | | |
|---|---|---|---|
| 6,266,160 B1 * | 7/2001 | Saito et al. | 358/407 |
| 6,351,316 B2 * | 2/2002 | Saito et al. | 358/1.15 |
| 6,437,873 B1 * | 8/2002 | Maeda | 358/1.15 |
| 6,618,749 B1 * | 9/2003 | Saito et al. | 709/207 |

FOREIGN PATENT DOCUMENTS

| | | |
|---|---|---|
| EP | 0838774 | 4/1998 |
| JP | 7-115532 | 5/1995 |
| JP | 8-18940 | 1/1996 |
| JP | 10-326244 | 12/1998 |
| JP | 10-374412 | * 12/1998 |
| JP | 11-168498 | 6/1999 |
| WO | 98/17041 | 4/1998 |

OTHER PUBLICATIONS

"The Multimedia Fax-MIME Gateway", Sanjiv P. Patel et al., IEEE MultiMedia, New York, US, IEEE Computer. Society, vol. 1, No. 4, Dec. 21, 1994, pp. 64-70, XP 000484152, ISSN 1070-986X.

"A Simple Mode of Facsimile Using Internet Mail", Toyoda et al., Network Working Group, Request for Comments (RFC) 2305, WIDE Project and Cisco, Mar. 1998.

English Language Abstract of JP 8-18717.

English Language Abstract of JP 10-326244.

English Language Abstract of JP 8-18940.

English Language Abstract of JP 7-115532.

English Language Abstract of JP 11-168498.

* cited by examiner

```
Message-Id:<2643C7C9AF86D211A26C0000F8011BF90EAC8F@LHH198>
From:<aaa@bbb.ccc.co.jp>
To:"ddd@eee.fff.ggg.co.jp"

Subject:XXX
Date:Wed,23 Dec 1998 11:10:37+0900
Mime-Version:1.0
X-Mailer:Internet Mail Service (5.5.2232.9)
Content-Type:text/plain:
          charset=" iso-2022-jp"

COMPRESSION SYSTEM:JPEG,TFF
RESOLUTION:200
COLOR SPACE PARAMATOR:10
```

FIG. 6

| COMMUNICATION TERMINAL ADDRESS | COMPRESSION FORMAT | RESOLUTION | COLOR SPACE PARAMETER |
|---|---|---|---|
| A | JPEG, TIFF | 200 | 10 |
| B | TFF | 200 | 13 |
|  |  |  |  |

33

SERVER APPARATUS AND INTERNET FACSIMILE APPARATUS AND COMMUNICATION TERMINAL CAPABILITY EXCHANGING METHOD

BACKGROUND OF THE INVENTION

1. Field of the Invention

The present invention relates to a server apparatus for managing a capability of a communication terminal and an internet facsimile apparatus for registering a capability of the internet facsimile apparatus to the server apparatus, and further relates to a communication terminal capability exchanging method.

2. Description of the Related Art

In the traditional facsimile apparatus such as G3/G4 FAX, before data transmission is actually performed, namely, at the time of pre-procedure, capability information is mutually exchanged between a recipient facsimile apparatus and the traditional facsimile apparatus. Then, the condition of data transmission is adjusted to the capability in order to send an appropriate image to the recipient.

On the other hand, there is proposed the so-called internet FAX in which image data is attached to an E-mail and the E-mail is transmitted to the recipient through a network such as internet, LAN.

The above internet FAX transfers and receives various kinds of data as compared with the traditional facsimile apparatus. For example, the data can contain a color image, an image having a different resolution, an image of various kinds of color spaces, etc. For this reason, in the internet FAX, it is predicted that the difference in capability between the respective apparatuses will become large as compared with the traditional facsimile apparatus.

However, since the internet FAX carries out data communication through the mail server, a direct communication with the recipient is not performed at the time of data communication. For this reason, unlike the traditional facsimile apparatus, capability exchange is not carried out.

There is a case in which a function of performing capability exchange in a point-to-point manner is provided to the internet FAX. However, in a case where the recipient is on the internet by a dial-up connection, a sender could not always access to the recipient. For this reason, there is a case in which capability exchange cannot be carried out.

Thus, in a case where no capability exchange can be carried out, there occurs necessity in which the apparatus having a high capability must convert the image quality to a low capability if there is a difference in the capability between the sender and the recipient. Moreover, since the recipient's capability is not sure, the image quality must be adjusted to the lowest quality.

Moreover, when the sender transmits data one-sidedly, the recipient cannot output data if received data is one that the recipient cannot be dealt with.

Even if the sender finds out the recipient's capability and the sender performs data conversion processing to adjust to the recipient's capability, this applies an unnecessary load to the sender forcefully and causes an increase in cost.

SUMMARY OF THE INVENTION

A first object of the present invention is to provide a server apparatus, which is capable of exchanging capability between terminals without increasing a load applied to the terminals.

A second object of the present invention is to provide a server apparatus, which realizes data conversion suitable for a terminal.

A third object of the present invention is to provide an internet facsimile apparatus, which is capable of registering its capability to said server apparatus.

A fourth object of the present invention is to provide a communication terminal capability exchanging method, which is capable of exchanging capability between terminals without increasing a load applied to the terminals.

A fifth object of the present invention is to provide a communication terminal capability exchanging method, which realizes data conversion suitable for a terminal.

The above object can be achieved by a server apparatus having: means for receiving a mail from a communication terminal; means for analyzing the received mail so as to extract capability information included in said mail; and capability information storing means for storing said capability information extracted by said extracting means to be made to correspond to communication terminal specific information specifying a communication terminal.

Also, the above object can be achieved by a server apparatus having: mail server means for receiving a mail from a communication terminal and transmitting the mail to the other communication terminal; and means for determining whether or not said mail includes capability information when receiving said mail, and extracting and storing said capability information when said mail includes capability information.

Further, the above object can be achieved by an internet facsimile apparatus having: means for scanning an original so as to obtain image data; means for converting said image data to a mail so as to transmit said mail over the internet or a local area network; and means for obtaining capability information of the internet facsimile apparatus, generating a capability information notification mail including said capability information, and transmitting said capability information notification mail, thereby notifying said server apparatus of said capability information.

Also, the above object can be achieved by a method for exchanging capability of a communication terminal, contains: receiving a mail from a communication terminal; analyzing the received mail so as to extract capability information included in said mail; and storing said extracted capability information to be made to correspond to communication terminal specific information specifying a communication terminal.

Moreover, the above object can be achieved by a computer-readable storage medium storing a computer-executable program code therein, said program code having: means for instructing said computer to receive a mail from a communication terminal; means for instructing said computer to analyze said received mail and to extract capability information included in said mail; and means for instructing said computer to store said extracted capability information to be made to correspond to communication terminal specific information specifying a communication terminal.

Furthermore, the above object can be achieved by a computer-readable storage medium storing a computer-executable program code therein, said program code having: means for instructing said computer to recognize communication terminal specific information specifying a communication terminal of a recipient of a mail to which an image file is attached; means for instructing said computer to obtain recipient's capability information corresponding to said communication terminal specific information from the content which said capability information storing means stores; and means for instructing said computer to determine whether or not said image file is suitable for said recipient's capability information so as to transfer said image file to the other server and register said image file when said image file is not suitable for said recipient's capability information.

According to the present invention, the network server receives capability information of the communication terminal through the E-mail, and registers capability information to correspond to the address of the communication terminal. This makes it possible to carry out the capability exchange between the communication terminals, which perform data exchange through the E-mail, such as an internet facsimile apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 6 is a view showing one example of an electronic mail (E-mail) in which an internet FAX transmits its capability information to the mail server according to the embodiment of the present invention;

DETAILED DESCRIPTION OF THE PREFERRED EMBODIMENTS

An embodiment of the present invention will now be specifically explained with reference to the accompanying drawings.

Figure 1:
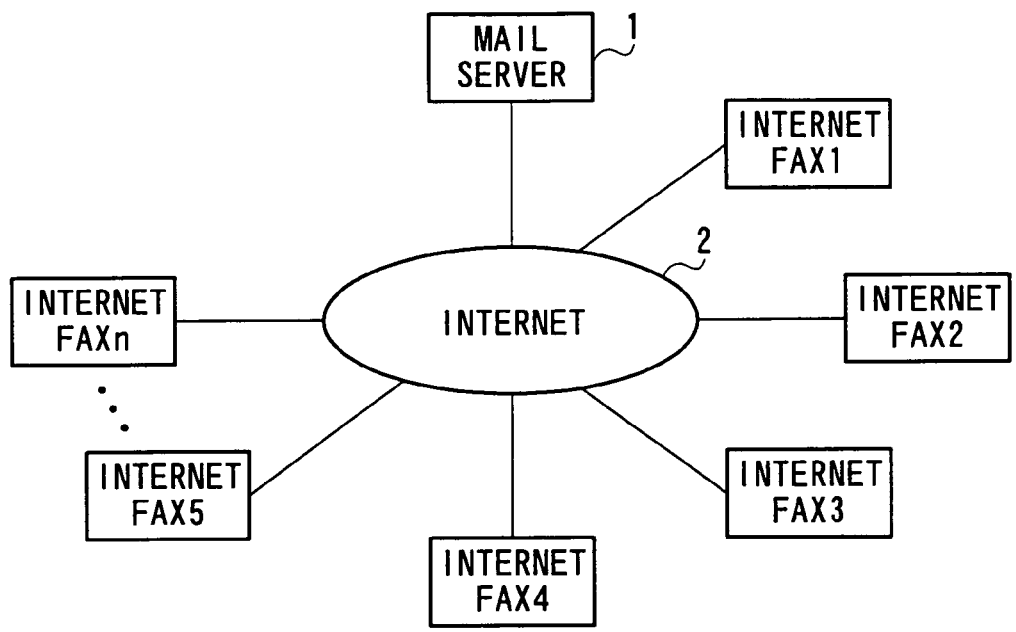
FIG. 1 is a system conceptual view showing an environment in which an internet mail server according to an embodiment of the present invention operates.

FIG. 1 is a system conceptual view showing an environment in which an internet mail server according to an embodiment of the present invention operates.

A mail sever 1 according to the present invention is connected to the internet 2. A plurality of internet Faxes 1 to n for receiving and transmitting image data is connected to the internet 2. Each internet Fax 1 to n is always connected to the internet 2 through LAN or a leased line or connected thereto by dialing up.

Figure 2:
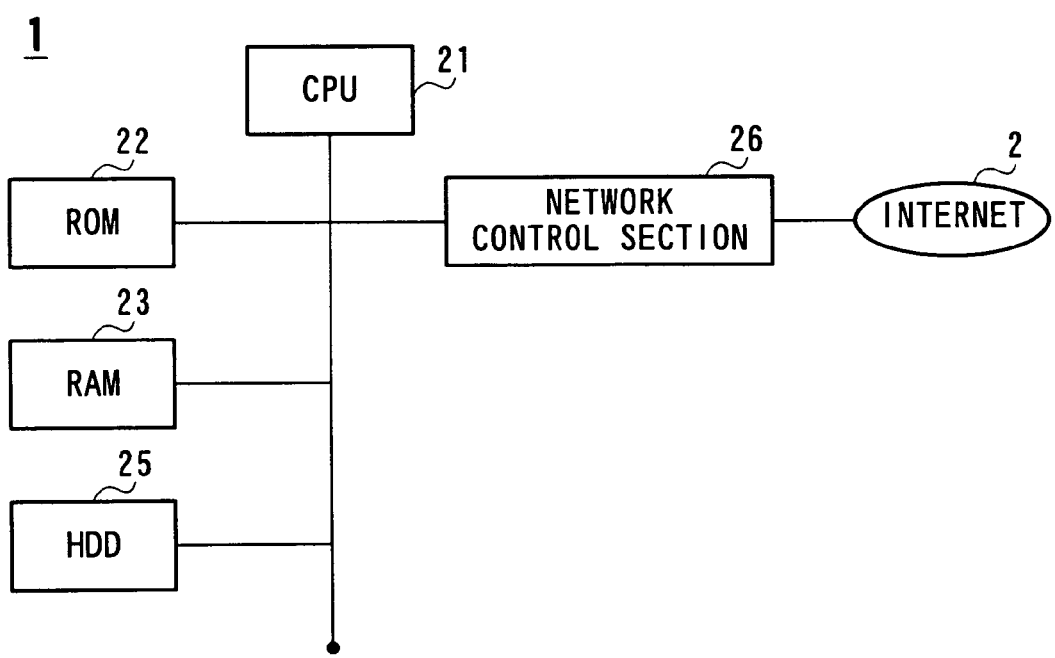
FIG. 2 is a hardware block diagram showing the mail server according to the embodiment of the present invention.

FIG. 2 is a hardware block diagram showing the mail server according to the embodiment of the present invention. A CPU 21 executes a program to carry out the control of the entire apparatus. A ROM 22 stores the program, which the CPU 21 executes. A RAM 23 is a memory for executing the program. A hard disk drive (HDD) 25 is an external storage apparatus for storing received E-mail or various kinds of tables. Also, a network control section 26 is an interface for executing procedures necessary for receiving and transmitting the e-mail over the internet 2.

Figure 3:
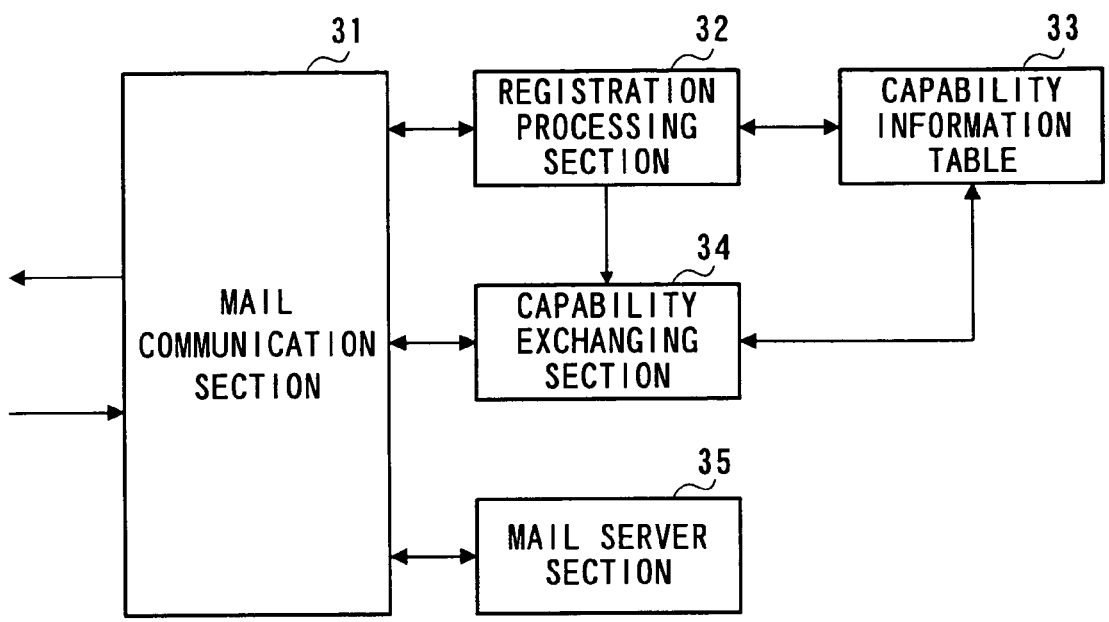
FIG. 3 is a block diagram showing basic functions of the mail server according to the embodiment of the present invention.

FIG. 3 is a block diagram showing basic functions of the mail server according to the embodiment of the present invention. A mail communication section 31 receives and transmits E-mail with a communication terminal such as an internet FAX over the internet 2. A registration processing section 32 extracts capability information of internet FAX on a sender from E-mail received by the mail communication section 31, and registers extracted data to a capability information table 33.

A capability exchanging section 34 recognizes the quality of image data of the received E-mail, compares the recognized quality of image data with capability information of a recipient's internet FAX, and exchanges image data based on the comparison result.

A mail server 35 carries out relay and management in connection with the receiving and transmitting E-mail, similar to the general mail server.

Figure 4:
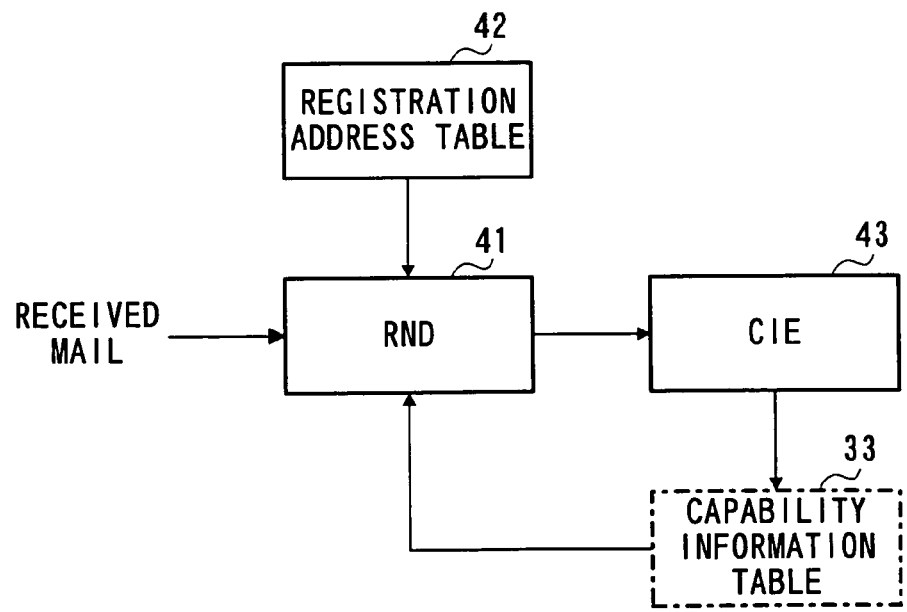
FIG. 4 is a capability block diagram showing a registration processing section of the mail server according to the embodiment of the present invention.

FIG. 4 is a capability block diagram showing a registration processing section of the mail server according to the embodiment of the present invention. A registration-necessary determining section (hereinafter referred to as RND) 41 analyzes the received E-mail, and determines whether or not registration of capability information is needed. More specifically, RND 41 compares a destination address with a registration address registered in a registration address table 42, and checks whether or not both agree with each other. Also, RND 41 checks whether or not there is a sender address, which is designated to [From] in a mail header, in the capability information table 33. Then, if the destination address agrees with the registration address and there is no sender address in the capability information table 33, RND 41 determines that registration of capability information is needed.

A capability information extracting section (hereinafter referred to as CIE) 43 extracts capability information included in the E-mail, and registers the extracted information to the capability information table 33.

Figure 5:
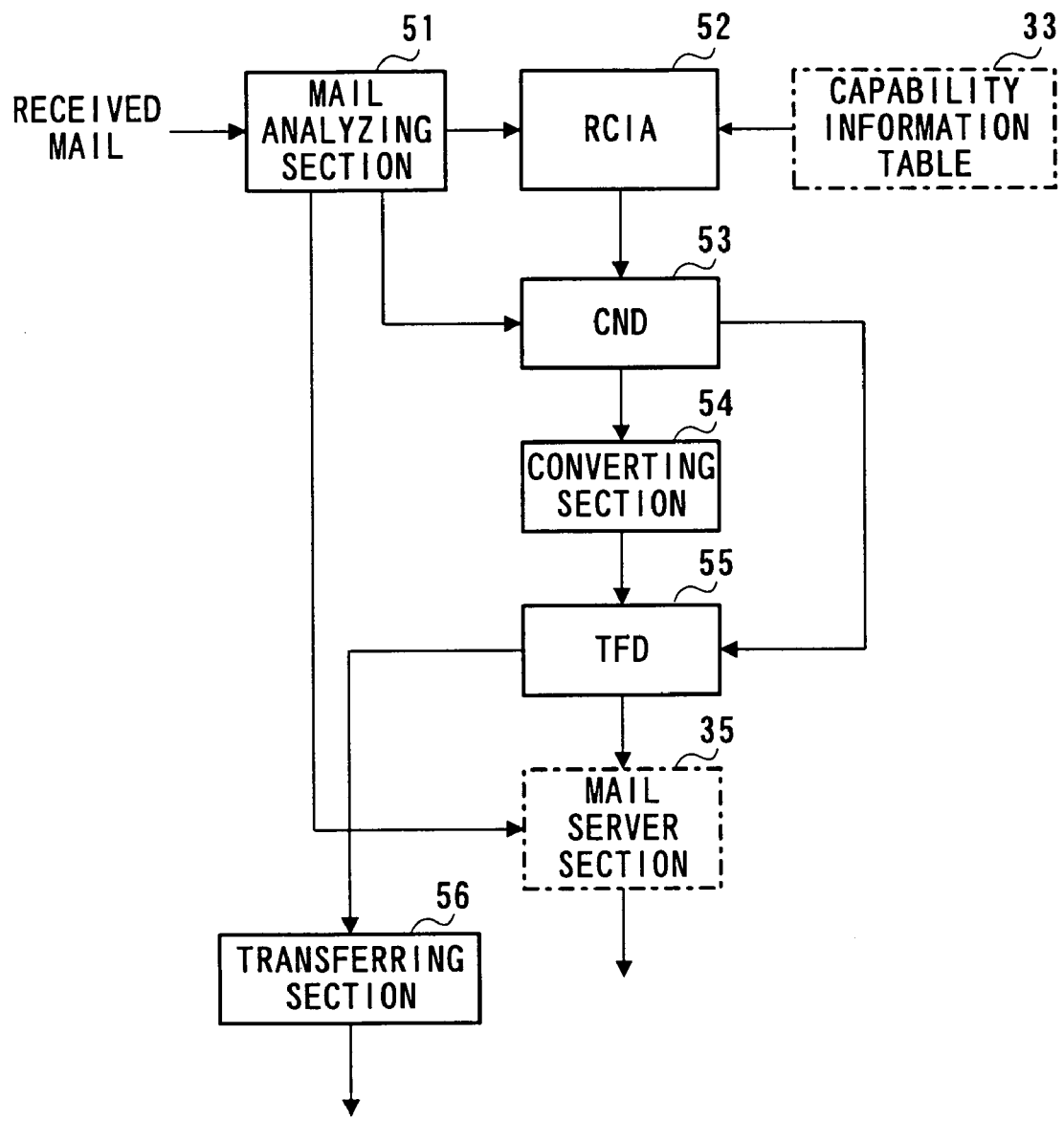
FIG. 5 is a functional block diagram showing a capability exchange processing section of the mail server according to the embodiment of the present invention.

FIG. 5 is a functional block diagram showing the aforementioned capability exchanging section 34. A mail analyzing section 51 analyzes the received E-mail and obtains the destination address, which is designated to [TO:] in the mail header, and image file information such as a compressed format, resolution, color space parameter, etc of an image file attached to the received E-mail.

A recipient capability information obtaining section (hereinafter referred to as RCIG) 52 reads recipient capability information from the capability information table 33 based on the destination address.

A conversion-necessary determining section (hereinafter referred to as CDN) 53 compares image file information obtained from the E-mail with recipient capability information obtained by the RCIG 52, and determines whether or not conversion processing is needed.

A converting section 54 converts the attached file of the E-mail in accordance with recipient capability. For example, this data conversion includes compressed format conversion in which data compressed by a certain compression format is converted to data compressed by the other compression format, a reduction in resolution, color reduction processing.

In a case where the volume of the received E-mail is so large that the recipient's internet Fax cannot receive it, for example, a transmission/forwarding determining section (hereinafter referred to as TFD) 55 determines whether the E-mail is forwarded to the other server or is transferred to the mail server 35 as it is.

A transferring section 56 carries out registration of the other arbitrary server and provides notification of an address of the server to the recipient.

FIG. 6 is a view showing one example of E-mail in which an internet FAX transmits its capability information to the mail server 1.

A registration address, <aaa@bbb.ccc.co.jp>, is described in the sender address [To:] of the mail header. Also, in a mail body portion, capability information of a file compression format, resolution and a color space are described in a format of text data. In connection with capability information, a new definition may be added to the mail header portion so as to be described therein.

Figures 7, 8:
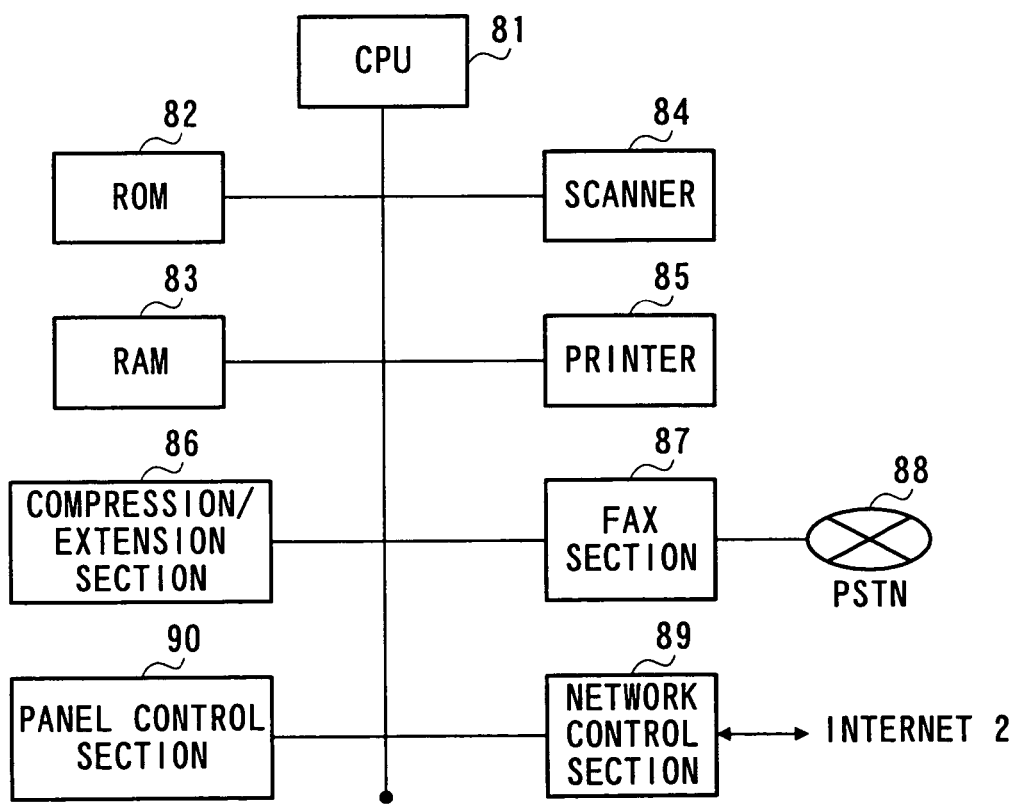
FIG. 7 is a view showing one example of a capability information table of the mail server according to the embodiment of the present invention.
FIG. 8 is a block diagram showing the structure of the internet FAX according to the embodiment of the present invention.

FIG. 7 is a view showing one example of the capability information table 33. In the capability information table 33, capability information of the corresponding communication terminal is made to correspond to the address of the communication terminal and registered. Capability information includes the file compression format, resolution, and the color space parameter of the image file. Every time when a new communication terminal is registered, an address of the communication terminal is added to the capable information table 33. It is possible to add or change the item of capability information as required.

Figure 9:
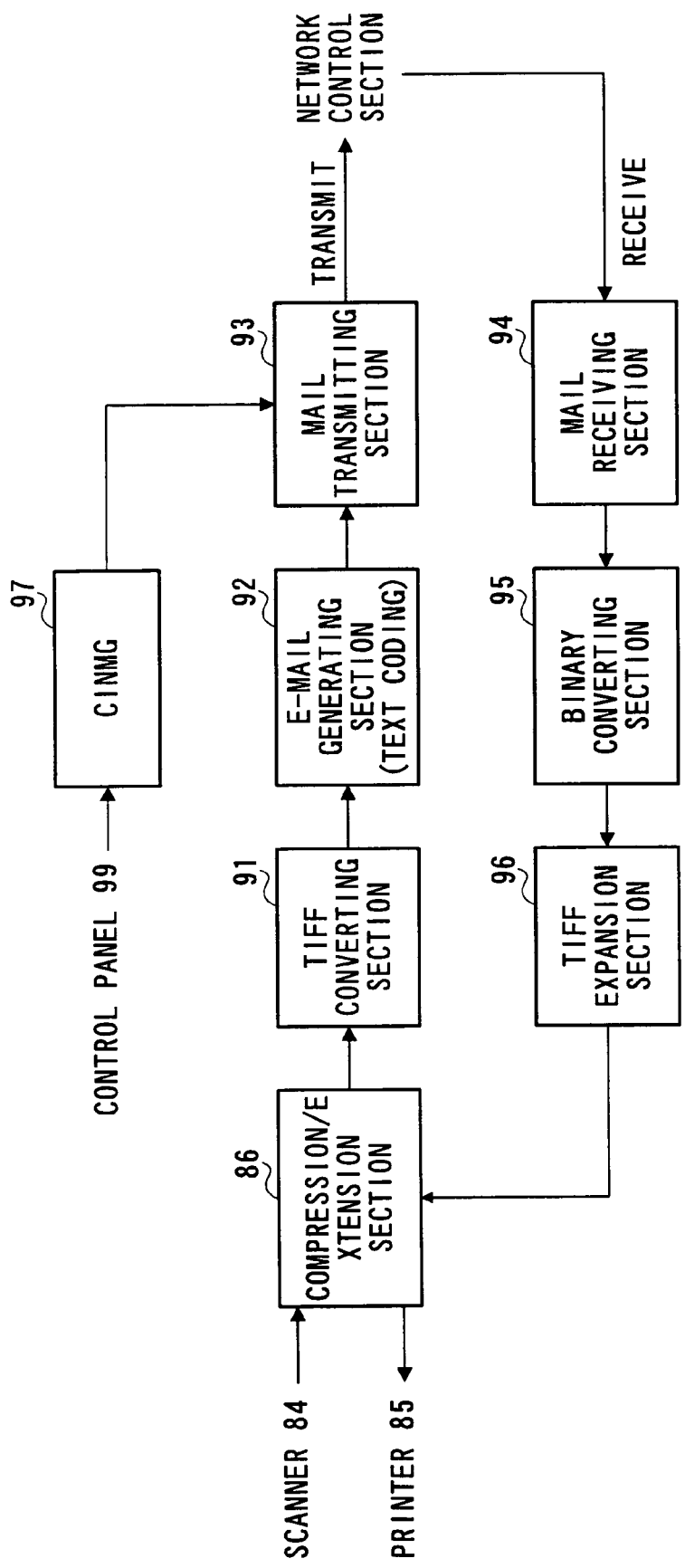
FIG. 9 is a block diagram showing the function of the internet FAX according to the embodiment of the present invention.

FIG. 8 is a block diagram showing the structure of internet FAXes 1 to n that makes communications with the mail server according to the embodiment. FIG. 9 is a block diagram showing the function of the internet FAXes 1 to n, which can be realized by executing a program.

A CPU 81 executes the program and controls the entire apparatus. A ROM 82 stores the program, which the CPU 81 executes.

A RAM 83 is a memory that executes the program and stores various kinds of data such as a mail, an image file.

A scanner 84 scans an original, and obtains image data. A printer 85 prints out received image data.

A compression/decompression section 86 compresses image data scanned by the scanner to an MH file and decompress compressed data received. A FAX section 87 receives and transmits data by facsimile communications, and carries out modulation and demodulation when data is received and transmitted over a public switched telephone network (PSTN) 88.

A network control section 89 is an interface for executing the process necessary for receiving and transmitting the mail over the internet 2.

A panel control section 90 has dial keys, and a touch panel, and is used in instruct operations such as a designation of recipient, a designation of transmission start, etc. to the internet FAX.

In the above-structured internet Fax, image data scanned by the scanner 84 is compressed by the compression/decompression section 86 at a transmission starting time. Next, compressed imaged data is converted to a TIFF file by a TIFF converting section 91. In the TIFF file, one compressed data to one page is stored. Then, an E-mail generating section 92 generates an E-mail including TIFF file as an attached file. Namely, TIFF file is text coded so as to be put into a data section of a E-mail in accordance with such as MIME (Multipurpose internet Mail Extensions). Thereafter, the E-mail is sent to the mail server 1 through the network control section 89 shown in FIG. 8.

On the other hand, a mail receiving section 94 receives the E-mail is received from the mail server 1 at a receiving time. Next, the attached file portion of the received E-mail is converted to binary data i.e., TIFF file from the text code by a binary converting section 95. Thereafter, the TIFF file is opened by a TIFF opening section 96. The compression/decompression section 86 decompress the compressed data included in the TIFF file and sends the decompressed data to the printer 85. The printer 85 prints out image data-received.

The aforementioned internet FAX comprises a capability information notification mail generating section (hereinafter referred to as CINMG) 97. When power is turned on or in accordance with the user's operation, the CINMG 97 obtains its capability information and generates an E-mail including capability information (capability information notification mail, hereinafter referred to as CIN MAIL), and transmits CIN MAIL to a registration address. The capability information in the initial state and the registration address are stored in the ROM 82 at a factory shipping time. The operation is carried out by depressing such as function keys and switches of the operation panel 90 to which a capability information transmission is allocated.

Figure 10:
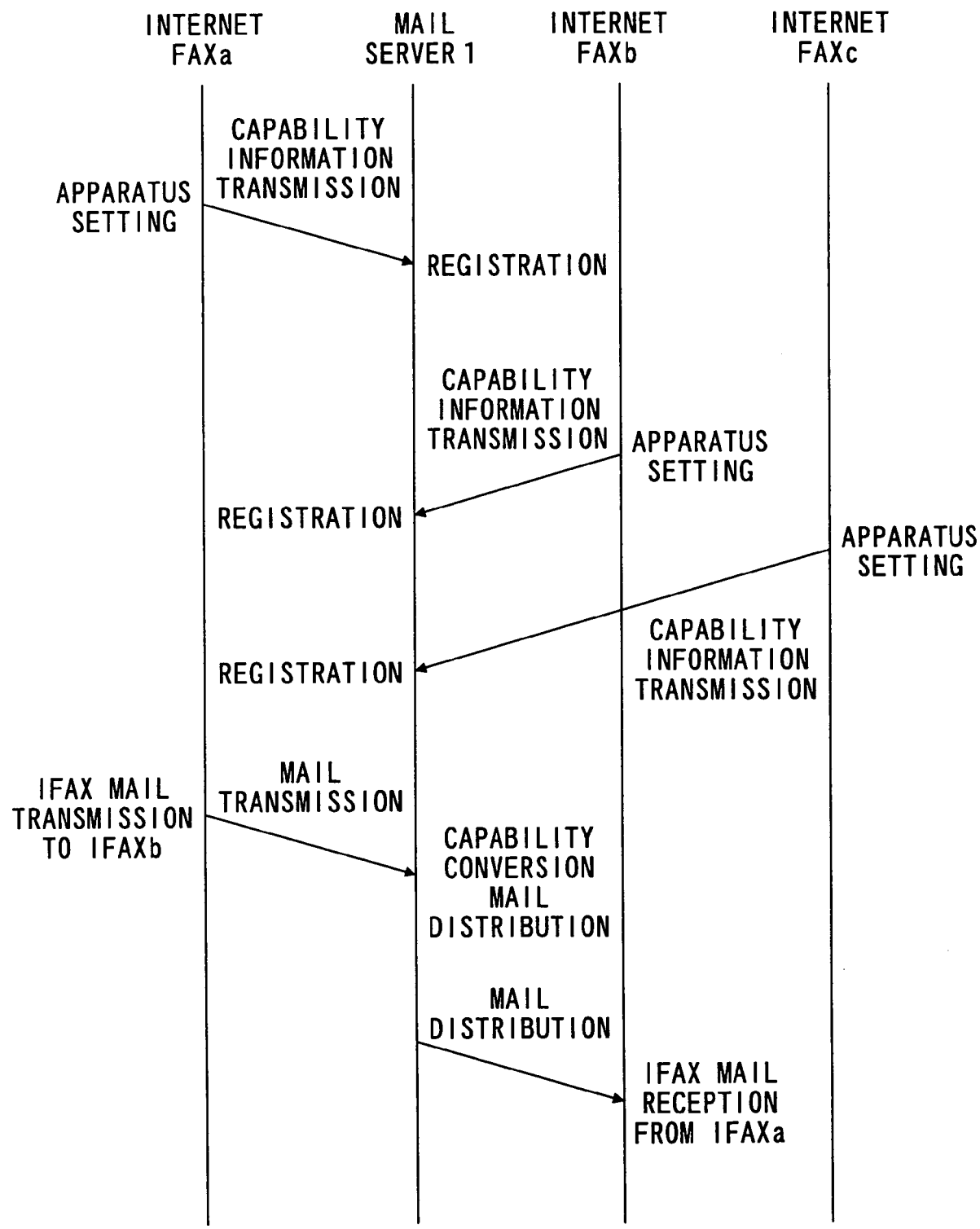
FIG. 10 is a process view showing data exchange between the mail server according to the embodiment of the present invention and the internet Fax.
Figure 11:
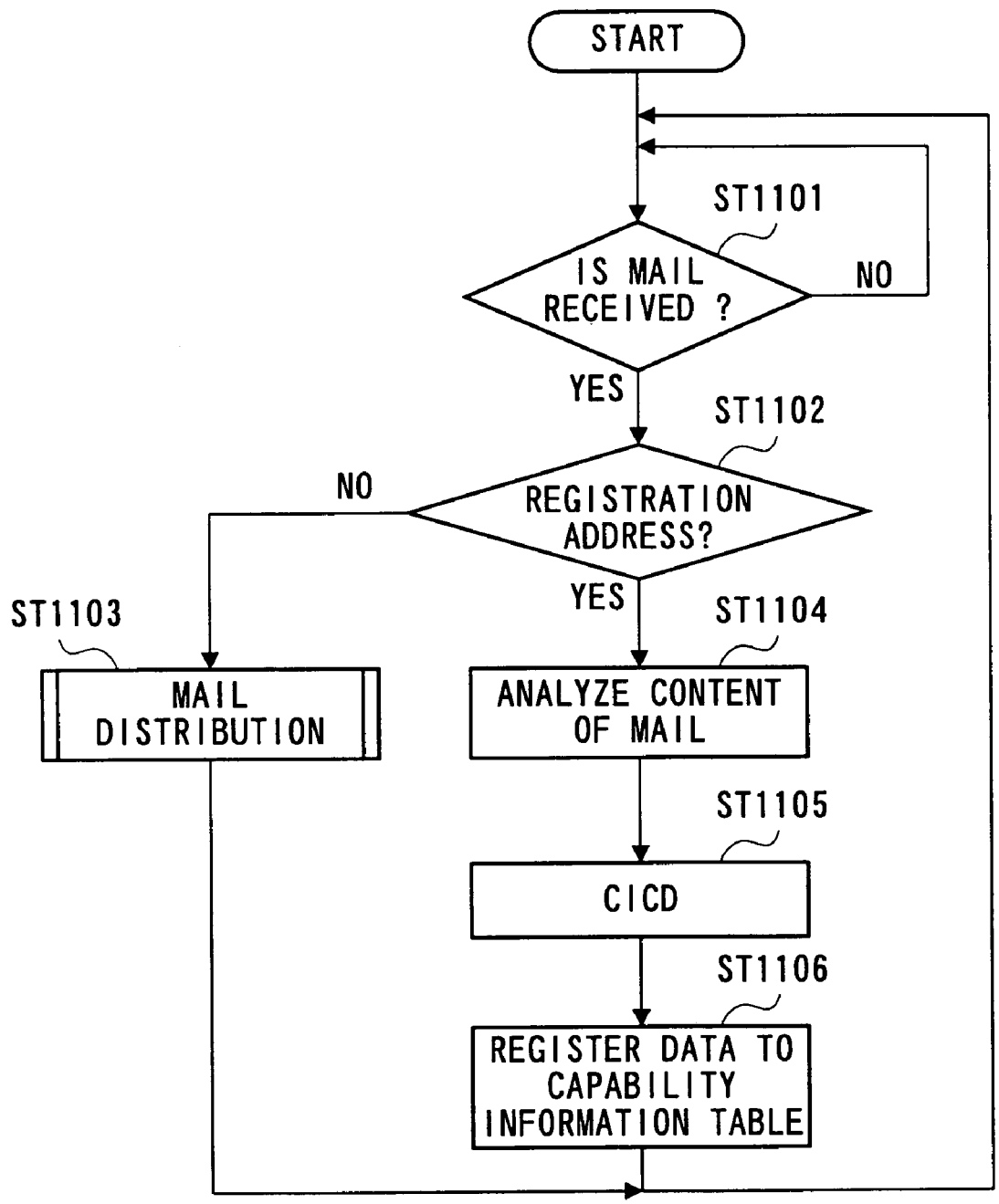
FIG. 11 is a flowchart showing each process of a capability information registration of the mail server according to the embodiment of the present invention.

Next, an operation of the above-structured mail server 1 will be explained. FIG. 10 is a process view showing data exchange between the mail server 1 and each of internet Faxa, FAXb, and FAXc. As shown in FIG. 10, for example, when internet FAXa is set, CIN MAIL is transmitted to the mail server 1 from each of internet Faxa, FAXb, and FAXc. The mail server 1 carries out the following capability registration processing. FIG. 11 is a flowchart showing each process of capability information registration of the mail server according to the embodiment.

When the mail server 1 receives an E-mail in Step (hereinafter referred to as ST) 1101, RND 41 of the registration processing section 32 checks whether or not the destination address of the received E-mail conforms to the registration address in ST1102. When the destination address of the received E-mail does not conform to the registration address, the mail server 35 carries out normal mail distribution processing in ST1103, and the operation goes back to ST1101.

On the other hand, when the destination address of the received E-mail conforms to the registration address in ST1102, the CIE 43 analyzes the content of CIN MAIL, and extracts capability information in ST1104. Next, CIE 43 generates capability information constructing data (hereinafter referred to as CICD) based on extracted capability information. CICD is information of an image format that can be processed by each communication terminal. Then, in ST1105, CIE 43 registers CICD in the capability information table 43 to correspond to the sender address. After the registration, the operation goes back to ST1101 and waits for E-mail reception.

Figure 12:
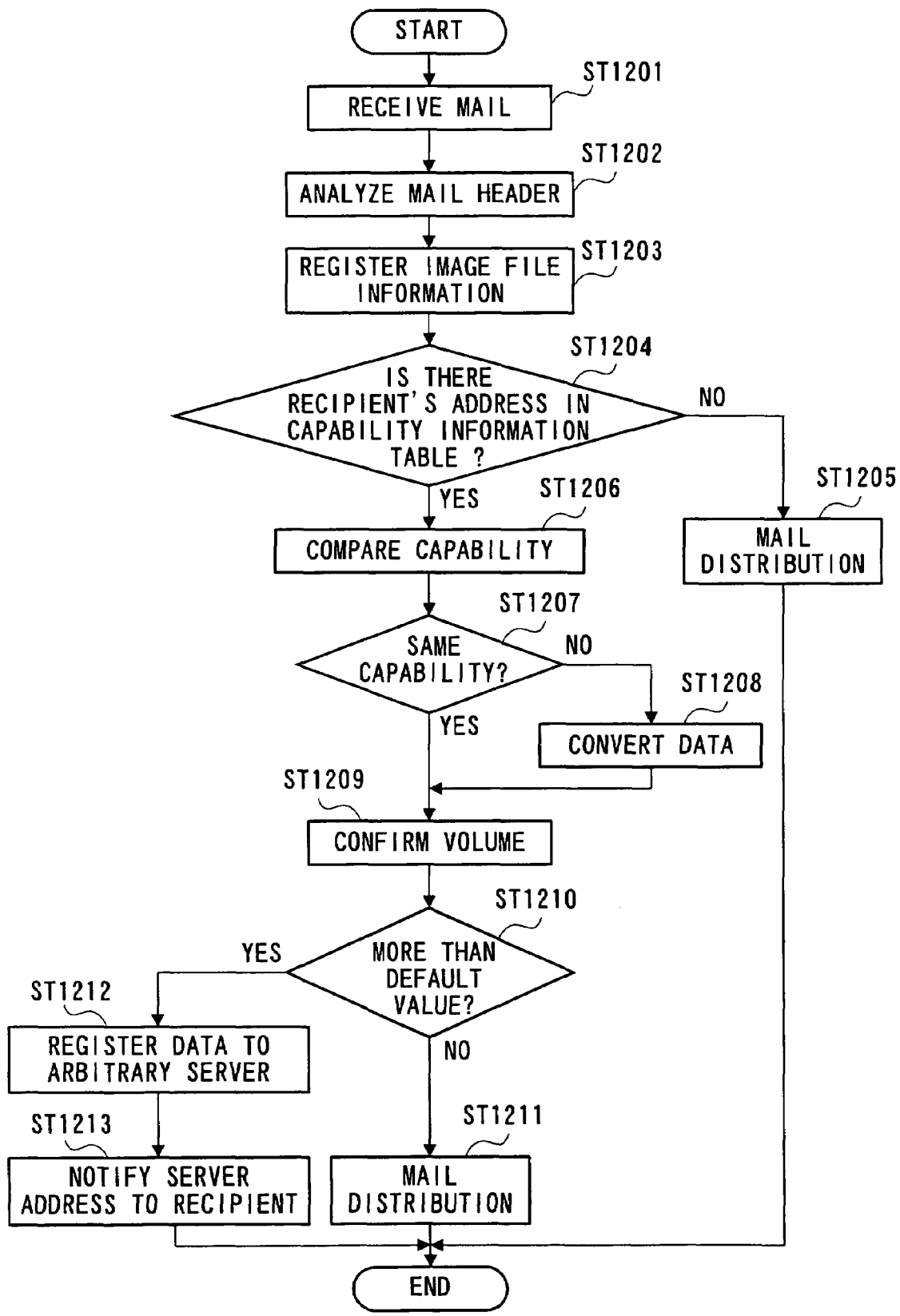
FIG. 12 is a flowchart showing each operation of capability exchanging of IFAX mail of the mail server according to the embodiment of the present invention.

Next, the following will explain an operation of the mail server in transmitting facsimile data in an E-mail format (hereinafter referred to as IFAX mail) to the other internet FAX from one internet FAX. FIG. 12 is a flowchart showing each operation of capability exchanging of IFAX mail of the mail server 1 according to the embodiment.

In ST1201, the mail communication section 31 receives IFAX mail. In ST1202, the mail analyzing section 51 shown in FIG. 5 analyzes the mail header portion of IFAX mail, and obtains the destination address and the sender address. The mail analyzing section 51 also analyzes image file information of the image file attached to IFAX mail. In ST1203, the mail analyzing section 51 stores the obtained image file information to RAM 3.

Next, in ST1204, RCIG 52 checks whether or not there is the obtained designation address in the capability information table 33. When there is no designation address in the capability information table 33 in ST1204, the operation moves to a mail distribution by the mail server 35 in ST1205, and processing is ended.

On the other hand, when there is the designation address in the capability information table 33 in ST1204, CND 53 compares the capability of the recipient's internet FAX registered with image file information of IFAX mail in ST1206. Next, in ST1207, CND 53 checks whether or not both are the same as each other, that is, the recipient's internet FAX can deal with the image file attached to IFAX mail.

When both are not the same in ST1207, the converting section 54 performs data conversion in ST1208, and the operation moves to ST1209. Specifically, coded image data is once converted to raw data, and raw data is coded in a predetermined coding format which is different from the original code image data. A more detailed explanation will be given. For example, a case of conversion of TIFF file data having MH data to TIFF file having JPEG data will be explained. A TIFF file is received, the file header portion of the TIFF file and an IFD (Information Filed Directory) portion are removed therefrom, and MH data, which are image data, are fetched. The MH data are converted to raw data. The raw data are converted to JPEG files. Thereafter, the file header portion and the IFD portion are added obtain to the JPEG files so as to generate a TIFF file. At this time, the fact that image data are converted to the JPEG files is registered in coding information of image data included in the IDF portion.

On the other hand, when both are the same in ST1207, the operation goes to ST1209. In ST1210, TFD 55 checks the volume of the unconverted IFAX mail and that of the converted IFAX mail. Then, in ST1210, TFD 55 checks whether or not the volume of IFAX mail is more than a default value.

In ST 1210, when the volume of IFAX mail is smaller than the default value, the operation moves to the mail distribution by the mail server 35 in ST1211, and processing is ended.

On the other hand, when the volume of IFAX mail is more than the default value in ST1210, the transferring section 56 transfers data of IFAX mail to the other arbitrary server and registers data in ST1212. Also, in ST1213, the transferring section 56 transmits an E-mail, which includes the fact that data of IFAX mail has been transferred and an URL address of a destination server, to the recipient. After the transmission, processing is ended.

Next, the following will explain the processing of updating capability information when capability is improved such as addition of a function expansion board in internet FAX.

Figure 13:
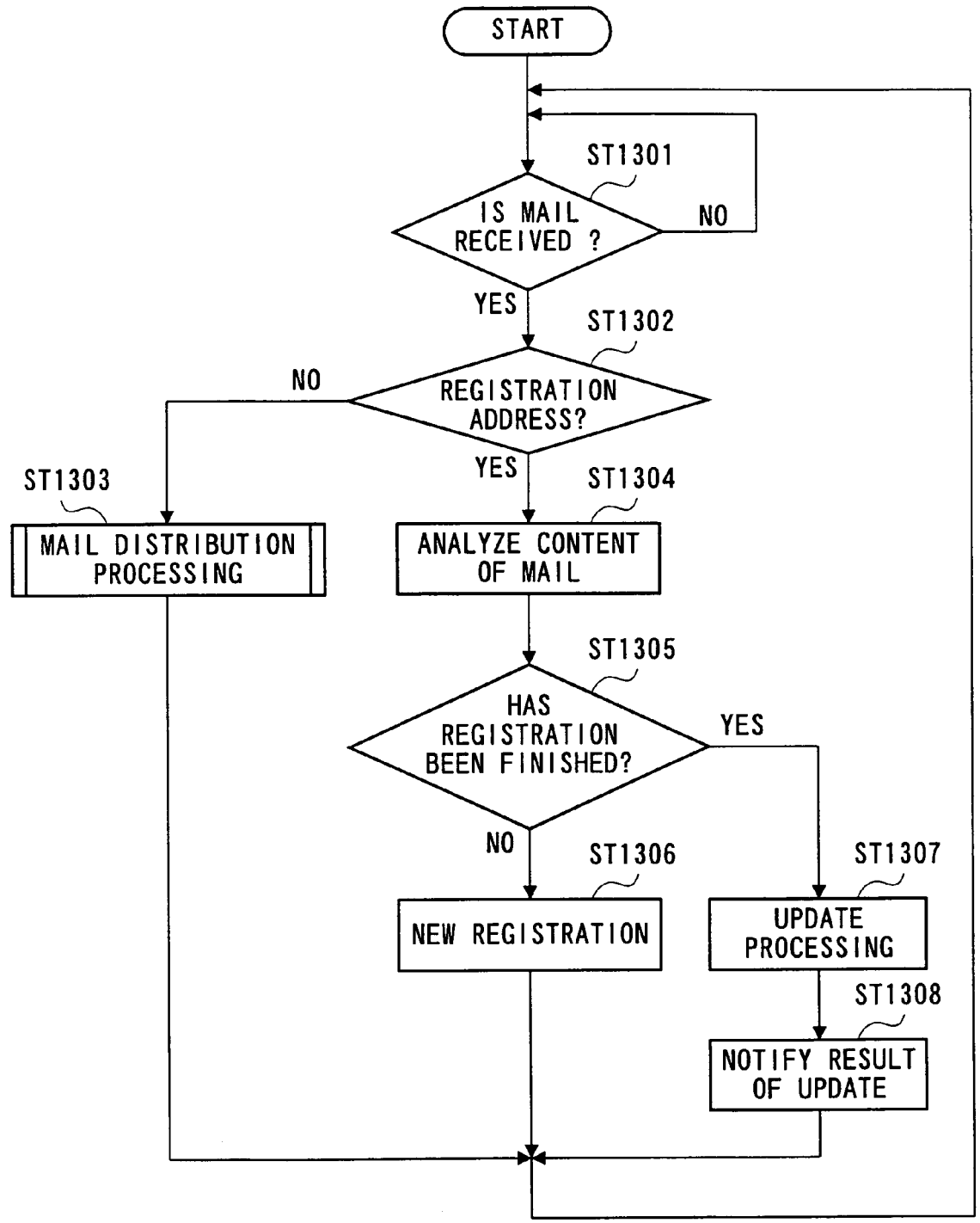
FIG. 13 is a flowchart showing each process of capability information update processing of the mail server according to the embodiment of the present invention.

FIG. 13 is a flowchart showing each process of capability information update processing of the mail server according to the embodiment.

In ST1301, when the mail server 1 receives an E-mail, RND 41 of the registration processing section 32 checks whether or not the destination address of the received E-mail conforms to the registration address in ST1302. When the destination address of the received E-mail does not conform to the registration address, the mail server 35 carries out normal mail distribution processing in ST1303, and the operation goes back to ST1301.

On the other hand, when the destination address of the received E-mail conforms to the registration address in ST1302, CIE 43 analyzes the content of CIN MAIL, and extracts capability information in ST1304. Next, CIE 43 generates CICD based on extracted capability information.

Next, in ST1305, RND 41 checks whether or not capability information of the sender address has been registered. If the capability information of the sender address has been registered, old capability information is updated to new capability information in ST1306. Next, in ST1307, an E-mail is transmitted to the sender address to notify that capability information has been updated, and the operation goes back to ST1301.

While, if the capability information of the sender address has been registered, capability information is registered in the capability information table 33 in accordance with the same procedure as the capability information registration shown in FIG. 11 and the operation goes back to ST1301.

In the analysis of the content of the mail shown in ST1104 of FIG. 11 and ST1304 of FIG. 13, if no capability information is included in the E-mail, it is possible to transmit an error mail to the sender.

As explained above, the mail server 1 according to the embodiment receives CIN MAIL from the internet FAX, and extracts capability information from CIN MAIL. Next, the sender address and extracted capability information are made to correspond to each other and the resultant is registered in the capability table 33. This makes it possible to obtain the capability of the internet FAX from the capability information table 33 based on the mail address.

The mail server 1 obtains recipient capability information of the E-mail from the capability information table 33 when receiving the E-mail. Then, the image file attached to the E-mail is expanded using the recipient's internet FAX to check whether or not the image file can be output. If the image file can be output, the E-mail is distributed as it is. If the image file cannot be output, the image file is converted to be appropriate to the recipient capability, thereafter the E-mail is distributed. As a result, the recipient expands the image file attached to the E-mail and outputs the image file without fail. By converting the image file to be appropriate to the recipient capability, the image, which the recipient's internet FAX can handle and which has the highest quality, can be obtained. Moreover, since it is unnecessary for the sender to carry out the file conversion, there is no possibility that an unnecessary load is applied onto the sender's internet FAX.

As explained above, when the image file conversion is carried out, the increase in the volume of the image file after conversion is forecast. However, the mail server 1 checks the volume of E-mail after the image file conversion. Then, when the volume of IFAX mail is more than the default value and the recipient internet FAX cannot carry out the reception, the E-mail is transferred to the other server and a notification of the URL address of the other server is provided to the recipient. The recipient accesses the other server, browses or downloads the content of E-mail. This makes it possible to surely transmit the content of E-mail to the recipient when the image file is converted.

In the above-explained embodiment, the image conversion processing was carried out when the image file is not appropriate for the recipient capability. However, it is possible to transfer the E-mail to the other server without carrying out the image conversion and provide the notification of the URL address of the other server to the recipient.

Also, the mail server 1 updates old capability information is updated to new capability information when receiving capability information notification mail from the registered internet FAX. This makes it possible to store the latest capability information of internet FAX in the registration information table 33. Since the E-mail that notifies that capability information has been updated is transmitted to the sender's internet FAX, the sender can confirm the completion of update.

Moreover, the mail server 1 can determine whether the received E-mail should be distributed or the capability information registration should be carried out based on the recipient address of the E-mail. For this reason, the mail server function and the capability information registration function can be realized by one server, thereby resulting in the cost reduction of the network facilities. It is, of course, possible to provide the mail server and the server for capability information registration, separately.

On the other hand, the aforementioned internet FAX acquires the its capability information, generates the capability information notification mail automatically, and transmits the mail to the registration address. This makes it possible to easily transmit capability information to the network server apparatus, which carries out capability information management.

The present invention is not limited to the above-explained embodiment. For example, the mail server 1 referred to the capability information table 33 which the mail server 1 itself held. However, it is possible for the other internet FAX to refer to the capability information table 33 from the outer section. In this case, the sender's internet FAX can know the capability of the recipient internet FAX even in a state that the sender's internet FAX is not connected to the internet 2.

Moreover, in the above-explained embodiment, the mail server 1 registered the recipient mail address in the capability information table 33 to correspond to capability information. However, other than the recipient address, communication terminal specific information such as a mail address, which is allocated to the communication terminal, an ID number, a telephone number, a name, URL (Uniform Resource Locator) or an IP address can be considered. Further, in the aforementioned embodiment, the facsimile apparatus was explained as a communication terminal. However, the scope of the present invention includes the other image communication apparatus. For example, the present invention includes a PC to which a LAN card or a modem is connected to perform data exchange over the internet. The scanner or the printer can be connected to the PC through an outer section I/F. The present invention also includes a network scanner having a network communication interface, and a network copy machine. Moreover, the present invention includes an multi function printer apparatus comprising a scanner, a printer, a copy machine, a facsimile apparatus, etc.

Furthermore, the present invention includes a computer-readable storage medium having a program code causing a computer to execute the same processing as that of the facsimile apparatus according to the aforementioned embodiment.

The present invention is not limited to the above described embodiments, and various variations and modifications may be possible without departing from the scope of the present invention.

This application is based on the Japanese Patent Application No.HEI 11-15760 filed on Jan. 25, 1999, entire content of which is expressly incorporated by reference herein.

What is claimed is:

1. A server apparatus connected with a facsimile apparatus via the Internet, the server apparatus comprising:
    a memory configured to store reception capabilities regarding a type of facsimile data that the facsimile apparatus can receive, the reception capabilities being distinct from the facsimile data; and
    a controller configured to receive an e-mail from the facsimile apparatus, to determine whether or not an e-mail address included in the received e-mail is a predetermined address, the predetermined address indicating the reception capabilities of the facsimile apparatus to be stored in the memory, the controller being further configured to store the capabilities of the facsimile apparatus in the memory, in response to a determination that the e-mail address is the predetermined address.

2. A server apparatus connected with a facsimile apparatus via the Internet, the server apparatus comprising:
    a memory configured to store reception capabilities regarding a type of facsimile data that the facsimile apparatus can receive, the reception capabilities being distinct from the facsimile data; and
    a controller configured to receive, from the facsimile apparatus, an e-mail with a predetermined address, the predetermined address indicating that the e-mail contains data regarding the capabilities of the facsimile apparatus to be stored in the memory of the server apparatus, the controller being further configured to store the capabilities of the facsimile apparatus in the memory.

3. An Internet facsimile apparatus connected with a server apparatus via the Internet, the Internet facsimile apparatus comprising:
    a communicator configured to communicate with a server apparatus via the Internet; and
    a controller configured to transmit, to the server by e-mail, reception capabilities regarding a type of facsimile data that the Internet facsimile apparatus can receive, the transmitted e-mail having a predetermined address, the predetermined address indicating that the e-mail contains data regarding the capabilities of the Internet facsimile apparatus to be stored in the server apparatus.

* * * * *